United States Patent [19]

Naganuma

[11] Patent Number: 5,377,040
[45] Date of Patent: Dec. 27, 1994

[54] POLARIZATION INDEPENDENT OPTICAL DEVICE

[75] Inventor: Norihisa Naganuma, Kawasaki, Japan

[73] Assignee: Fujitsu Limited, Kawasaki, Japan

[21] Appl. No.: 799,159

[22] Filed: Nov. 27, 1991

[30] Foreign Application Priority Data

Nov. 27, 1990 [JP] Japan ................. 320769

[51] Int. Cl.⁵ ............................... G02B 5/30
[52] U.S. Cl. ..................... 359/494; 359/495; 359/496; 359/497
[58] Field of Search ............ 359/494, 495, 496, 497, 359/498, 499, 583, 487

[56] References Cited

U.S. PATENT DOCUMENTS

| | | | |
|---|---|---|---|
| 3,963,995 | 6/1976 | Jacob | 331/94.5 C |
| 4,198,123 | 4/1980 | Kremen | 359/496 |
| 4,595,261 | 6/1986 | Baasch et al. | 359/487 |
| 4,634,232 | 1/1987 | Tateoka | 359/487 |

FOREIGN PATENT DOCUMENTS

| | | | |
|---|---|---|---|
| 0368335 | 5/1990 | European Pat. Off. | |
| 3149615 | 7/1983 | Germany | |
| 0088009 | 7/1980 | Japan | 359/496 |
| 56-137307 | 10/1981 | Japan | |
| 0202409 | 11/1983 | Japan | 359/496 |
| 60-159821 | 8/1985 | Japan | |
| 0241502 | 9/1989 | Japan | 359/496 |
| 0264917 | 10/1990 | Japan | 359/496 |

OTHER PUBLICATIONS

"Multi/Demultiplexer Isomg a 4-Port Optical Circulator and Interference Filters," M. Koga et al., Transactions of the Institute of Electronics, Information and Communication Engineers of Japan, vol. E72, No. 10, Oct. 1989, Tokyo, pp. 1086–1088.

Primary Examiner—Ricky D. Shafer
Attorney, Agent, or Firm—Staas & Halsey

[57] ABSTRACT

A polarization independent optical device capable of eliminating the apparent polarization dependence of a dielectric multi-layer film and permitting the design of an optical path at an optional angle of incidence of light beam. The polarization independent optical device comprises a tapered double-refractive crystal disposed so that an optic axis thereof is perpendicular to an incident optical path, and a dielectric multi-layer film disposed on an exit side of light beam with respect to the tapered double-refractive crystal.

4 Claims, 6 Drawing Sheets

POLARIZATION INDEPENDENT OPTICAL DEVICE

BACKGROUND OF THE INVENTION

1. Field of the Invention

The present invention relates to a polarization independent optical device such as, for example, an optical coupler or an optical multiplexer/demultiplexer.

2. Description of the Prior Art

In an optical device for an optical communication system, e.g. an optical multiplexer/demultiplexer or an optical coupler, constituted by a prism having a dielectric multi-layer film, in the case where the angle of incidence of light beam on the dielectric multi-layer film is as large as 20° to 45°, the polarization dependence of the dielectric multi-layer film is high and so the characteristics of the optical multiplexer/demultiplexer or the optical coupler are unstable. Such polarization dependence of the dielectric multi-layer film restricts the design of an optical path in the optical device because a semiconductor laser having polarizability is used mainly as a light source for the optical communication system, and for eliminating this inconvenience, the development of an optical device with a polarization independent dielectric multi-layer film has been pursued.

FIG. 1 is a plan view of a conventional optical coupler assembly. Four fiber lens assemblies 4a, 4b, 4c and 4d are mounted to a housing 2. Within the housing 2 is disposed a glass substrate 6. A coupler film 8 constituted by a dielectric multi-layer film and a non-reflective film 10 are stuck on the glass substrate 6. The angle of incidence, $\theta$, on the coupler film 8 from each of the fiber lens assemblies 4a–4d is set at a value not larger than 15° at which the polarization dependence of the coupler film 8 is not so high.

For example, light beam emitted from the fiber lens assembly 4a is split at a predetermined split ratio by the coupler film 8 and then coupled to the fiber lens assemblies 4b and 4c. Light beam from the fiber lens assembly 4b is split at a predetermined split ratio by the coupler film 8 and then coupled to the fiber lens assemblies 4a and 4d. In this way, light beam from the fiber lens assembly 4c or 4d is also split and coupled.

Thus, heretofore, in order to avoid the influence of the polarization dependence of the dielectric multi-layer film, the angle of incidence of light beam on the same film has been kept to a value not larger than about 15° in constituting an optical device. In this construction, however, it is difficult to set a reflected beam at right angles to or in parallel with a transmitted beam, and the construction of an optical path becomes complicated.

SUMMARY OF THE INVENTION

It is therefore an object of the present invention to provide a polarization independent optical device capable of eliminating the polarization dependence of a dielectric multi-layer film on the surface and permitting the design of an optical path at an optional angle of incidence of light beam.

In accordance with an aspect of the present invention, there is provided a polarization independent optical device comprising a tapered double-refractive crystal disposed so that an optic axis thereof is perpendicular to an incident optical path, and a dielectric multi-layer film disposed on an exit side of light beam with respect to the tapered double-refractive crystal.

Preferably, said optical device includes a ½ wavelength plate having an optic axis inclined 22.5° relative to a vibrating direction of P- or S-wave of the dielectric multi-layer film, provided on the light beam exit side with respect to the dielectric multi-layer film.

In accordance with another aspect of the present invention there is provided a polarization independent optical device comprising a cubic beam splitter including first and second rectangular prisms each having a slant face, and a dielectric multi-layer film formed in an interface between the first and second rectangular prisms which are stuck together at the respective slant faces, an incidence-side surface of the cubic beam splitter being inclined at a predetermined angle relative to an incident optical path; and a tapered double-refractive crystal stuck on the incidence-side surface of the cubic beam splitter and having an optic axis perpendicular to the incident optical path.

In accordance with a further aspect of the present invention there is provided a polarization independent optical device comprising a beam splitter having a dielectric multi-layer film; and an optical isolator disposed on a light beam incidence side with respect to the said beam splitter and including a polarizer, an optical rotator and an analyzer, the analyzer of the optical isolator having a transmitting polarization plane inclined 45° from vibrating directions of P- and S-waves of the dielectric multi-layer film.

According to the present invention, incident light beam can be brought into a non-polarized state by passing it through the tapered double-refractive crystal and hence the polarization dependence of the dielectric multi-layer film can be eliminated on the surface. As a result, it becomes possible to design an optical path at an optional angle of incidence of light beam and therefore possible to attain the reduction in size and higher performance of an optical device.

The above and other objects, features and advantages of the present invention and the manner of realizing them will become more apparent, and the invention itself will best be understood from a study of the following description and appended claims with reference to the attached drawings showing some preferred embodiment of the invention.

DESCRIPTION OF THE PREFERRED EMBODIMENTS

First, the principle of the present invention will be explained below with reference to FIG. 2.

Figure 1:
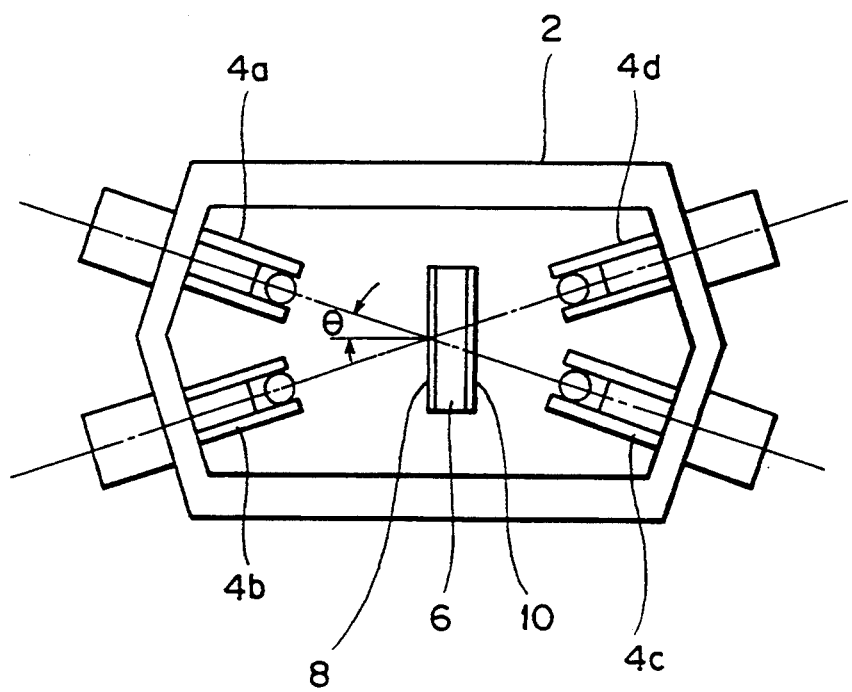
FIG. 1 is a plan view of a conventional optical coupler assembly.
Figure 2:
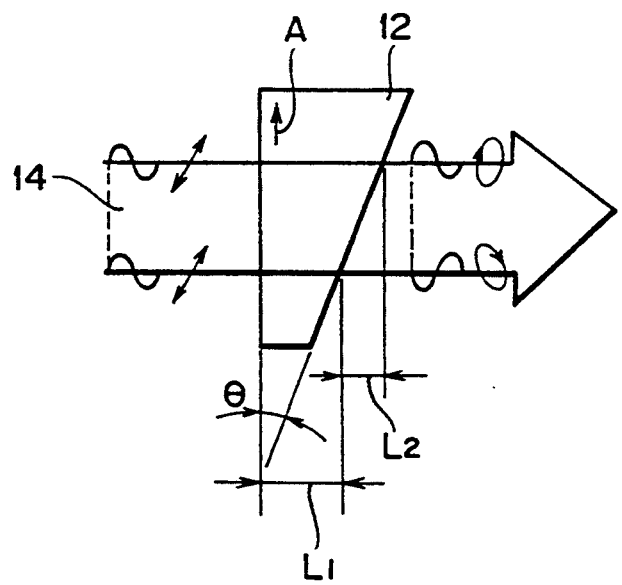
FIG. 2 is a schematic diagram for explaining the principle of the present invention.

In FIG. 2, the reference numeral 12 denotes a double-refractive crystal, e.g. quartz, having a taper angle $\theta$ of approximately 2° or smaller, which crystal is disposed in such a manner that an optic axis A thereof is perpendicular to an optical path of a light beam 14. The number of waves N of light of a wavelength $\lambda$ passing through a medium which has a refractive index represented by n and an optical path length represented by l is given as follows:

$$N = nl/\lambda \qquad (1)$$

The mark $L_1$ in FIG. 2 represents a phase difference generating optical path length between ordinary light and extraordinary light. If an ordinary light refractive index of the tapered double-refractive crystal 12 is $n_o$ and an extraordinary light refractive index thereof is $n_e$, the phase difference between the ordinary light and the extraordinary light of the portion $L_1$ is given as follows:

$$2\pi N = 2\pi(n_o - n_e)L_1/\lambda \qquad (2)$$

On the other hand, the mark $L_2$ in FIG. 2 represents a phase difference generating optical path length for a single light of ordinary or extraordinary light because of a finite diameter of the light beam 14. The phase difference of a light beam of diameter D passing through the double-refractive crystal 12 having a taper angle $\theta$ is given by the following equation:

$$2\pi N = 2\pi n D \tan\theta/\lambda \qquad (3)$$

Thus, when a light beam 14 having a diameter of 300 $\mu$m or so is passed through the tapered double-refractive crystal 12, there is generated a phase difference about $20\pi$ at both ends of the beam. Therefore, by passing a linearly polarized light beam 14 through the tapered double-refractive crystal 12, it can be brought into a non-polarized state. Thus, since a non-polarized light beam is incident on the dielectric multi-layer film, the polarization dependence of the same film can be eliminated on the surface.

Figure 3:
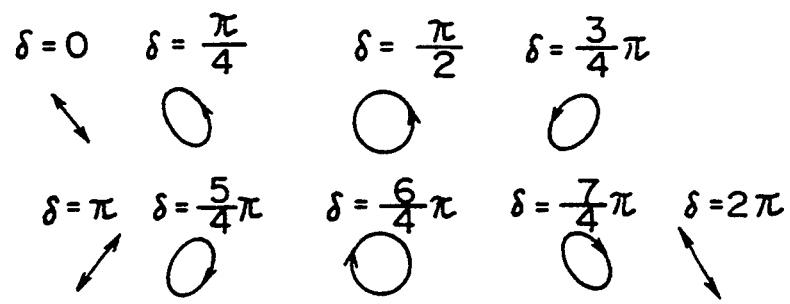
FIG. 3 is a schematic diagram for explaining variations of polarization based on phase differences.

FIG. 3 shows variations of polarization according to phase difference $\delta$. When the phase difference is 0, a linearly polarized light beam is obtained. The light beam changes into an eliptically polarized light beam and then a circularly polarized light beam as the phase difference increases. When the phase difference $\delta$ becomes $2\pi$, the polarization reverts to the original linear polarization.

Figure 4:
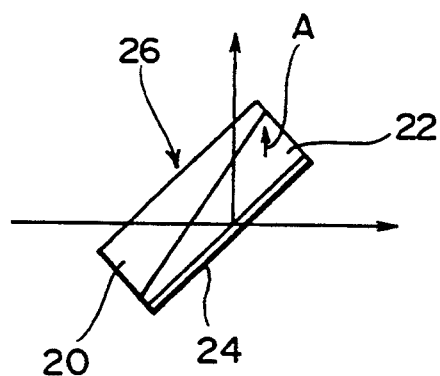
FIG. 4 is a plan view of a first embodiment of the present invention.

FIG. 4 is a plan view of an optical coupler according to a first embodiment of the present invention. In this embodiment, a tapered glass plate 20 and a tapered quartz plate 22 having an optic axis perpendicular to an incident optic path are stuck together to form a parallel flat substrate 26, and a coupler film 24 formed of a dielectric multi-layer film is vapor-deposited on the back of the tapered quartz plate 22. Incident light is brought into a non-polarized state by passing through the tapered quartz plate 22 of the substrate 26, and then impinges on the coupler film 24. Therefore, even if the angle of incidence is set at a large value of 45° or so, there does not occur a polarization dependence of the coupler film 24. For example, when the beam diameter is 1 mm and the taper angle of the tapered quartz plate 22 is 0.5°, a phase difference of at least $5\pi$ relative to a linearly polarized light is obtained between both ends of beam.

Preferably, the optic axis of the tapered quartz plate 22 is set perpendicularly to the incident optical path and is inclined 45° relative to the vibrating direction of P- or S- wave of the coupler film 24, whereby P- and S-wave components for the coupler film 24 of the light emitted from the tapered quartz plate 22 can be made equal in ratio, and hence it is possible to eliminate the apparent polarization dependence of the coupler film 24 completely.

Figure 5:
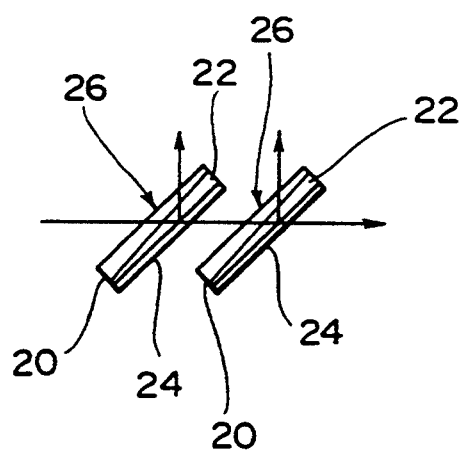
FIG. 5 is a plan view of a second embodiment of the present invention.

FIG. 5 is a plan view of an optical coupler according to a second embodiment of the present invention. In this embodiment, the parallel flat substrates 26 each with the coupler film 24 vapor-deposited thereon, shown in FIG. 4, are disposed in two stages to split light beam in two stages. In front of each coupler film 24 there is disposed a tapered quartz plate 22. This is because even if a non-polarized state is once obtained by the tapered quartz plate 22 of the first stage, a slight polarization is induced in reflected light and transmitted light due to the polarization dependence of the coupler film 24, so it is necessary to attain a non-polarized state in each stage.

Figure 6:
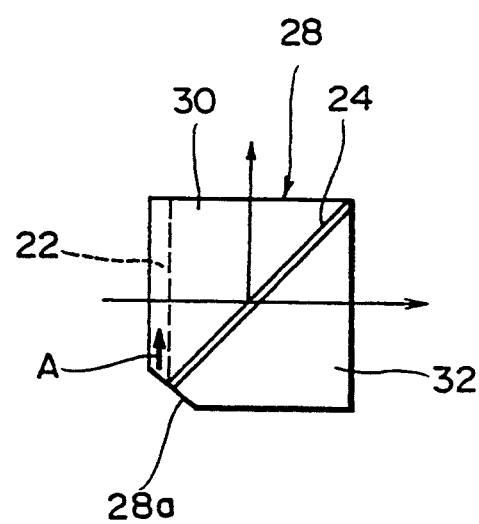
FIG. 6 is a plan view of a third embodiment of the present invention.
Figure 7:
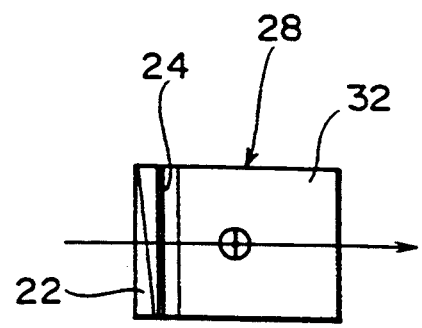
FIG. 7 is a side view of the third embodiment illustrated in FIG. 6.

FIG. 6 is a plan view of a third embodiment of the present invention and FIG. 7 is a side view thereof. In this embodiment, a coupler film 24 formed of a dielectric multi-layer film is sandwiched between two rectangular prisms 30 and 32 to form a cubic beam splitter 28. The beam splitter 28 has an incidence-side surface inclined by a predetermined angle, and a tapered quartz plate 22 having an optic axis A perpendicular to an incident optical path is stuck on the incidence-side surface. The beam splitter 28 is constructed so that its incidence- and exit-side surfaces are parallel to each other to prevent deflection of the optical path. Further, for ease of production, a cutout portion 28a is formed at one corner of the beam splitter 28.

Figure 8:
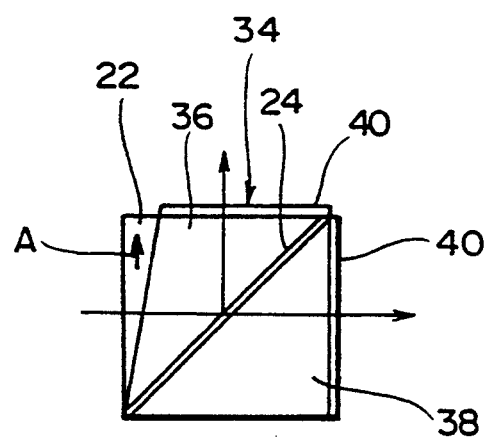
FIG. 8 is a plan view of a fourth embodiment of the present invention.

FIG. 8 is a plan view of a fourth embodiment of the present invention. In this embodiment, like the third embodiment, a coupler film 24 formed of a dielectric multi-layer film is sandwiched between two rectangular prisms 36 and 40 to form a cubic beam splitter 34. A tapered quartz plate 22 having an optic axis A perpendicular to an incident optical path is stuck on an incidence-side surface of the cubic beam splitter 34, while ½ wavelength plates 40 each having an optic axis inclined 22.5° relative to a vibrating direction of P- or S-wave of the coupler film 24 are stuck on exit-side surfaces of the beam splitter 34.

The light beam which was non-polarized by the tapered quartz plate 22 upon incidence on the beam splitter 34 again becomes polarized at the coupler film 24. In this embodiment, however, an optical rotation of 45° is made by the ½ wavelength plates 40 provided on the exit-side surfaces of the beam splitter 34, whereby P- and S-wave components for the next-stage coupler film are made equal in ratio and hence it is possible to eliminate the apparent polarization dependence for the coupler film provided in the next stage.

Figure 9:
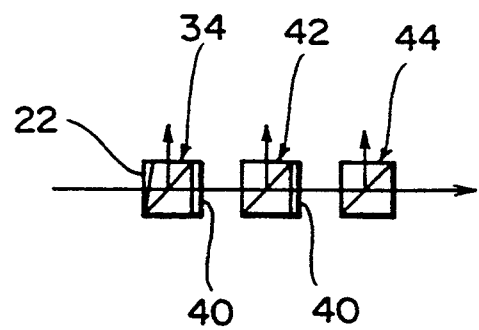
FIG. 9 is a plan view of a fifth embodiment of the present invention.

FIG. 9 is a plan view of a fifth embodiment of the present invention in which light beam is split in three stages. A beam splitter 34 with both a tapered quartz plate 22 and a ½ wavelength plate 40 stuck thereon, a beam splitter 42 with only a ½ wavelength plate stuck thereon, and an ordinary beam splitter 44, are arranged in series in an optical path of light beam, whereby the polarization dependence can be eliminated with respect to all of coupler films.

Figure 10:
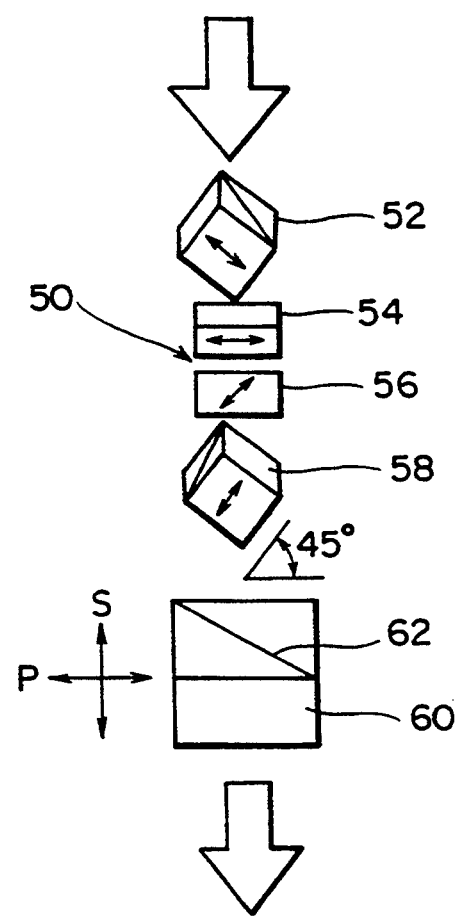
FIG. 10 is a schematic constructing diagram of a sixth embodiment of the present invention.

FIG. 10 is a construction diagram of a sixth embodiment of the present invention, in which the reference numeral 50 denotes an optical isolator comprising a polarized beam splitter (polarizer) 52, a YIG crystal 54, a ½ wavelength plate 56 and a polarized beam splitter (analyzer) 58. On a rear stage side of the optical isolator 50 there is disposed a cubic beam splitter 60 having a coupler film 62 in such a manner that a transmitting polarization plane of the beam splitter (analyzer) 58 is inclined 45° from vibrating directions of P- and S-waves of the coupler film 62 which is formed of a dielectric multi-layer film.

By disposing the optical isolator 50 and the beam splitter 60 in such a relation, P- and S-wave components for the coupler film 62 of the light emitted from the optical isolator 50 can be made equal in ratio, so that the apparent polarization dependence of the coupler film 62 can be eliminated.

What is claimed is:

1. A polarization independent optical device comprising:
    a cubic beam splitter including first and second rectangular prisms each having a slant face, and a dielectric multi-layer film formed in an interface between said first and second rectangular prisms which are stuck together at the respective slant faces, said cubic beam splitter having an incidence-side surface inclined at a predetermined angle relative to an incident optical path; and
    a tapered double-refractive crystal stuck on said incidence-side surface of said cubic beam splitter and having an optic axis perpendicular to the incident optical path.

2. A polarization independent optical device according to claim 1, further comprising a ½ wavelength plate provided on at least one surface on a light beam exit side of said cubic beam splitter, said ½ wavelength plate having an optic axis inclined 22.5° relative to a vibrating direction of P- or S-wave of said dielectric multi-layer film.

3. A polarization independent optical device according to claim 1, wherein the optic axis of said tapered double-refractive crystal is perpendicular to the incident optical path and is inclined 45° relative to a vibrating direction of P- or S-wave of said dielectric multi-layer film.

4. A polarization independent optical device comprising:
    a first cubic beam splitter comprising a first dielectric multi-layer film, a tapered double-refractive crystal formed on a light beam incidence-side surface thereof and having an optic axis perpendicular to an incident optical path, and a first ½ wavelength plate formed on a light beam exit-side surface thereof and having an optic axis inclined 22.5° relative to a vibrating direction of P- or S-wave of said first dielectric multi-layer film;
    a second cubic beam splitter disposed on the light beam exit side with respect to said first cubic beam splitter, said second cubic beam splitter comprising a second dielectric multi-layer film and a second ½ wavelength plate formed on an exit-side surface thereof, said second ½ wavelength plate having an optic axis inclined 22.5° relative to a vibrating direction of P- or S-wave of said second dielectric multi-layer film; and
    a third cubic beam splitter disposed on the light beam exit side with respect to said second cubic splitter, said third cubic beam splitter comprising a third dielectric multi-layer film.

* * * * *

UNITED STATES PATENT AND TRADEMARK OFFICE
CERTIFICATE OF CORRECTION

PATENT NO. : 5,377,040
DATED : December 27, 1994
INVENTOR(S) : N. Naganuma

It is certified that error appears in the above-indentified patent and that said Letters Patent is hereby corrected as shown below:

Col. 3, line 13, delete "1" and insert --  --.

Signed and Sealed this

Twelfth Day of September, 1995

Attest:

BRUCE LEHMAN

Attesting Officer     Commissioner of Patents and Trademarks